United States Patent [19]

Lenderman

[11] Patent Number: 4,693,312
[45] Date of Patent: Sep. 15, 1987

[54] METHOD OF UTILIZING PARAFFIN INHIBITORS

[75] Inventor: Gary L. Lenderman, Richmond, Tex.

[73] Assignee: Nalco Chemical Company, Naperville, Ill.

[21] Appl. No.: 915,196

[22] Filed: Oct. 3, 1986

[51] Int. Cl.$^4$ .............................................. E21B 37/06
[52] U.S. Cl. .................................. 166/279; 166/300; 166/304
[58] Field of Search ............... 166/304, 902, 279, 312, 166/310, 300, 371; 252/8.55 B

[56] References Cited

U.S. PATENT DOCUMENTS

| | | | |
|---|---|---|---|
| 3,533,470 | 10/1970 | Marsh et al. | 166/300 |
| 3,669,189 | 6/1972 | Fischer | 166/279 |
| 3,724,552 | 4/1973 | Snavely, Jr. | 252/8.552 |
| 3,724,553 | 4/1973 | Snavely, Jr. et al. | 252/8.552 |

*Primary Examiner*—Stephen J. Novosad
*Assistant Examiner*—Bruce M. Kisliuk
*Attorney, Agent, or Firm*—John G. Premo; Anthony L. Cupoli; Donald G. Epple

[57] ABSTRACT

An improved method for depositing a pour point depressant in an oil producing formation so that the pour point depressant can slowly dissolve in the oil as the oil is produced which comprises the steps of:

A. Adding an activator for the pour point depressant into the formation, and then;

B. Injecting a dispersion of the pour point depressant into the activator treated formation.

2 Claims, No Drawings

METHOD OF UTILIZING PARAFFIN INHIBITORS

It is a well known fact that crude oils and heavier fractions such as residual fuel oils often contain substantial quantities of waxy materials. When these oils are subjected to low temperatures, the waxy constituents crystallize and agglomerate into a solid gel. The gelling or stiffening of the oil interferes with the normal production of the oil and causes a number of handling problems. High viscosities and pour points result in a number of additional costs to production such as increased horsepower, equipment size and fuel to heat the crude. Particularly affected by these rheological problems are long distance pipelines and offshore production facilities.

In addition to higher viscosities, many crude oils will actually deposit the wax crystals directly on the cold surfaces as the crude is cooled during its production. The decrease in solubility of the wax in the crude oil with decreasing temperature results in deposits which further reduces the volume of oil that can be produced.

Many of the aforementioned problems have been alleviated in part by the addition of known paraffin inhibitors. Most of the proven paraffin inhibitors for crude oils make use of polymers. These polymers co-crystallize with the paraffin waxes and reduce the size of the crystals and their tendency to agglomerate on cold surfaces.

One of the greatest problems related to the use of pour point depressants (PPD's) in most oil field environments is the poor physical properties associated with these high molecular weight materials. Most effective chemicals are either solids or high pour point liquids or gels which pose a variety of handling problems in low temperature environments. Heated storage at the wellhead or dilution with solvents is normally required to allow continuous injection.

If it were possible to place conventional PPD's well into the producing formation which would allow them to be dissolved slowly, an advance in the art would be afforded.

PRIOR ART

British Pat. No. 1161188 discloses polymers containing aliphatic side chains of at least 14 carbon atoms formed by the polymerization of unsaturated compounds.

British Pat. No. 1274746 discloses the use of an ester of a copolymer of maleic anhydride and vinyl acetate where the ester is derived from an alcohol containing at least 20 carbon atoms.

U.S. Pat. No. 3,926,579 discloses the use of alpha olefin polymers and copolymers as pour point reducers.

U.S. Pat. No. 3,640,824 discloses the use of a mixture of branched polyethylene with a molecular weight greater than 6,000 and naphthalene and/or microcrystalline wax and/or asphaltenes as a paraffin inhibitor.

U.S. Pat. No. 3,630,280 discloses a method and composition for treating subterranean formations which consists of placing a solid mixture of high molecular weight ethylene vinyl acetate, low molecular weight ethylene vinyl acetate and a paraffin wax with a melting point between 135° and 170° F. This mixture allows slow controlled oil solubility in formations having temperatures between 125° and 155° F.

U.S. Pat. No. 3,879,177 discloses the use of a copolymer of maleic anhydride and vinyl methyl ether esterified with an alcohol containing 18 to 24 carbon atoms to inhibit the crystallization of wax and reduce its deposition on cold surfaces as demonstrated by the well known "cold finger" test.

THE INVENTION

An improved method for depositing a pour point depressant in an oil producing formation so that the pour point depressant can slowly dissolve in the oil as the oil is produced which comprises the steps of:

A. Adding an activator for the pour point depressant into the formation, and then;

B. Injecting a dispersion of the pour point depressant into the activator treated formation.

The Pour Point Depressants (PPD's)

The invention contemplates utilizing a wide variety of PPD's of the type previously described. A preferred class of PPD's are the ethylene vinyl acetate copolymers. These polymers are characterized as containing at least 20% by weight of vinyl acetate and usually will contain amounts ranging between 20–40% by weight. These polymers are further characterized as having molecular weights within the range of 5,000–30,000, with a preferred molecular weight weight range being 10,000–20,000.

The PPD's are utilized in the form of a dilute solution which may be either a hydrocarbon liquid solution of the PPD, an oil-in-water emulsion, or a slurry of the PPD in water with appropriate dispersing agents. Preferably, the PPD is utilized in the form of a dispersion of crude oil corresponding to the crude oil being produced by the formation to be treated. The concentration of these dispersions may vary between 0.5 up to about 10% by weight. Typical concentrations of the PPD in the dispersions are 1–3%. The word dispersion is used herein to describe the PPD's in the liquid medium in which they are fed. The dispersion is intended to include solutions, colloidal dispersions, slurries and mixtures depending upon the carrier employed, as well as the particle size density, etc. of the PPD.

The amount of PPD used to treat the formation to obtain enhanced paraffin control ranges between about 5–25 lbs of solid PPD per 1,000 gallons of fluid added to the formation. A typical dosage is 10–15 lbs of active PPD.

The Activator

The activator is a material that precipitates or interacts with the dispersion of the PPD to precipitate it from the liquid carrier and to place it into the formation, into which the PPD is injected.

In most instances it will be in the form of a dilute oil or water solution or emulsion thereof. The amount of activator generally being equal to the amount of PPD used. It may be in smaller or greater amounts depending upon the activator and PPD.

The activator, as indicated, is any chemical that will cause precipitation and remove the PPD from its carrier liquid when it contacts the activator which is placed well into the formation in the area where it is desired to place the PPD. In the case of ethylene vinyl acetate copolymers, a suitable class of activators are the lower aliphatic alcohols, e.g. methanol, ethanol, propanol and butanol. Methanol is a preferred activator.

Other activators that may be used, although less preferred, are such polar organic solvents as ketones, e.g. ethyl ketone, methylethyl ketone and the like. Also, usable are the low molecular weight aldehydes such as formaldehyde, acetaldehyde, and the like.

PRACTICE OF THE INVENTION

Amount of Chemical

The treatment described herein may be considered as a squeeze treatment.

It is preferred to use approximately 3 times the amount used for a continuous treatment over the squeeze-life period. This is because: ⅓ is lost to production right away; ⅓ is lost in formation never to be seen again; and ⅓ actually "adheres" to the formation face and feeds back slowly.

The dynamics of the formation environment can actually assist the chemical inhibition process. The hotter temperatures encountered and the presence of a flowing system will help to inhibit paraffin deposition at lower chemical concentrations.

Amount of Activator

An equal 1:1 volume of activator is used to calculate the amount of chemical needed. Typically a first step would be to blend the activator with 5 barrels of lease crude and then pump it down the tubing. Second, an additional 5 barrels of lease crude is pumped down the tubing. The last step is to add the chemical/diluent mixture and overflush. The activator facilitates formation penetration to help "adhesion" of the inhibitor onto the rock face.

Overflush

The formation generally will accept as much fluid as necessary. However, it is recommended not to exceed fracture pressures between 2,000–10,000 psi. Economics generally determines the extent of overflushing.

Shut In-Time

The well is preferably shut down for 24 hours following overflush. On the first 2 days after the shut-in period, the well should be returned to production at no more than half the daily production rate prior to squeezing. This allows the well to establish a better crude flow pattern out of the formation.

As indicated, the activator is added in advance of the PPD. After both materials had been added, the formation would be overflushed. The activator could also be added after the PPD or the addition of the activator could be split—part before and part after the PPD.

Using the above general technique, two wells were treated. The PPD used was an ethylene vinyl acetate copolymer having a molecular weight within the range of 10,000—20,000 as a 1% solution in the produced crude oil. It was tested at one well site in Texas and another in Wyoming. In both instances, improved and longer paraffin inhibition was achieved.

Having thus described my invention, it is claimed:

1. An improved method for depositing a polymeric pour point depressant in an oil producing formation so that the polymeric pour point depressant can slowly dissolve in the oil as the oil is produced which comprises the steps of:
   A. Adding an activator for the polymeric pour point depressant into the formation, and then;
   B. Injecting a dispersion of the polymeric pour point depressant into the activator treated formation.

2. The improved method of claim 1 where the polymeric pour point depressant is an ethylene vinyl acetate copolymer dispersed in a hydrocarbon liquid and the activator is methanol.

* * * * *